United States Patent [19]

Cottone et al.

[11] 4,274,483
[45] Jun. 23, 1981

[54] REACTION BONDING OF FERROUS METALS

[75] Inventors: Andrew J. Cottone; Zalman P. Saperstein, both of Racine, Wis.

[73] Assignee: Modine Manufacturing Company, Racine, Wis.

[21] Appl. No.: 62,893

[22] Filed: Aug. 1, 1979

[51] Int. Cl.³ .................... B23K 1/20; B23K 35/34
[52] U.S. Cl. .................... 165/153; 228/198; 228/263 D; 428/653
[58] Field of Search .................... 228/183, 198, 263 D, 228/263 E; 165/153, 166; 428/653

[56] References Cited

U.S. PATENT DOCUMENTS

| | | | |
|---|---|---|---|
| 2,179,258 | 11/1939 | Howarth | 148/26 |
| 2,368,403 | 1/1945 | Barnes | 228/263 E X |
| 2,817,895 | 12/1957 | Chill et al. | 228/198 |
| 3,069,765 | 12/1962 | Simpelaar | 228/198 |
| 3,247,899 | 4/1966 | Branch | 165/166 |
| 3,287,540 | 11/1966 | Connelly | 219/118 |
| 3,301,688 | 1/1967 | Simpelaar | 228/208 X |
| 4,032,059 | 6/1977 | Plegat | 228/183 |
| 4,150,179 | 4/1979 | Jones | 428/653 |

*Primary Examiner*—Gil Weidenfeld
*Assistant Examiner*—K. J. Ramsey
*Attorney, Agent, or Firm*—Wegner, Stellman, McCord, Wiles & Wood

[57] ABSTRACT

This invention relates to a method of bonding together a plurality of ferrous metal members, the resulting assembly and a heat exchanger comprising the thusly bonded metal members in which the members are bonded to each other by assembling them with aluminum metal between and in contact with them, coating this assembly with a liquid bonding composition as disclosed in Simpelaar U.S. Pat. No. 3,301,688 comprising a liquid solvent and a zinc halide and heating this assembly thereby causing the aluminum to displace zinc from the zinc halide with the zinc thereby uniting with the ferrous metal to form a secure joint comprising an alloy of iron from the ferrous metal members and zinc displaced from the zinc chloride.

3 Claims, 3 Drawing Figures

U.S. Patent      Jun. 23, 1981      4,274,483
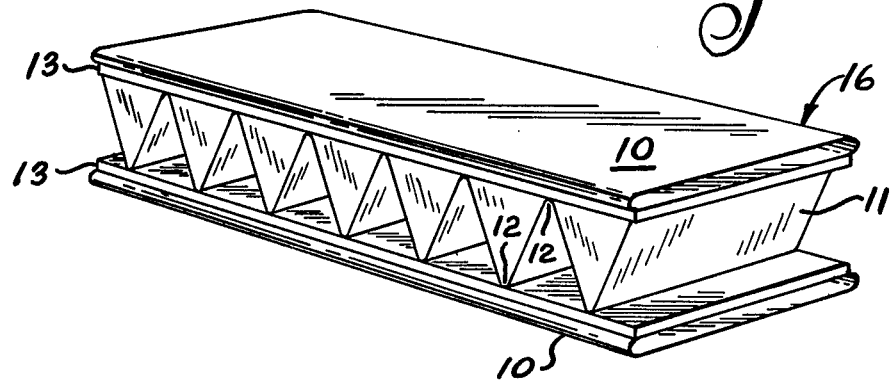
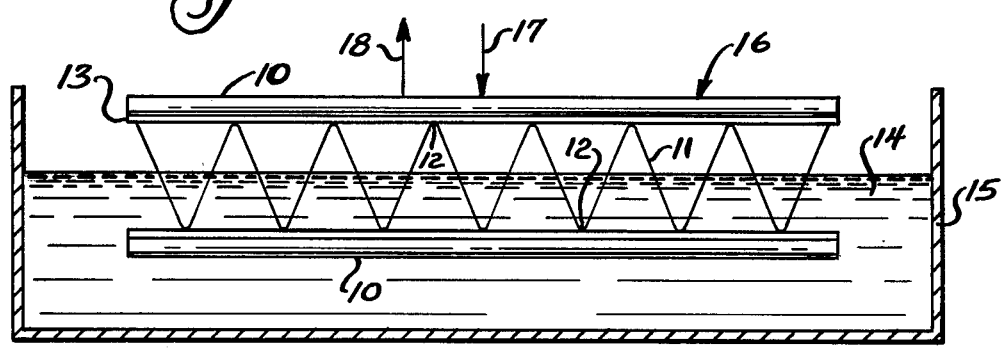
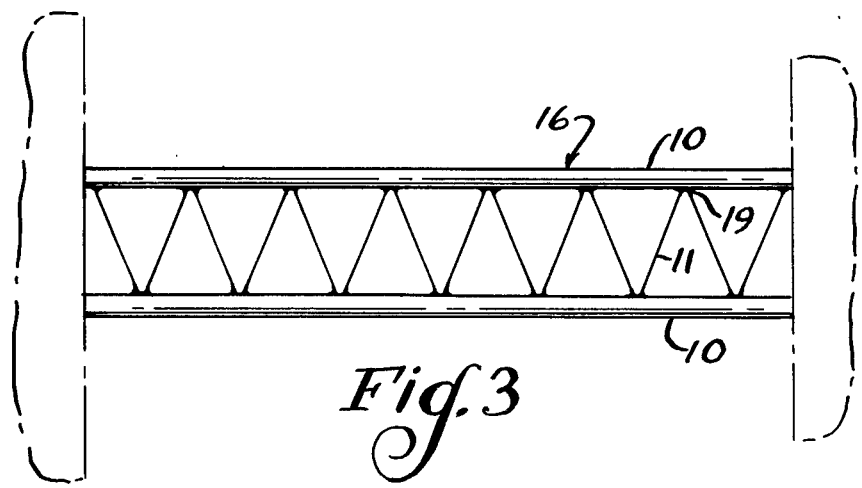

REACTION BONDING OF FERROUS METALS

BACKGROUND OF THE INVENTION

This invention relates to a method of forming a bonded assembly of ferrous metal members in which aluminum metal is used at the joint between the members to displace nascent zinc from a zinc halide solution at the joint which zinc then unites with the iron of the ferrous members in an alloy to form a secure bond. The invention also relates to an assembly of a plurality of ferrous metal members bonded together in this manner.

The invention also relates to a heat exchanger comprising an assembly of ferrous metal members thusly bonded together.

The most pertinent prior art of which we are aware is U.S. Pat. Nos. 2,179,258; 2,817,895; 3,069,765; 3,287,540 and 3,301,688.

The present invention provides a method of bonding together ferrous metal members by a reaction bonding technique in which aluminum is provided at the joint areas between these metal members and the resulting assembly coated with a liquid bonding composition as disclosed in the above Simpelaar patent comprising a liquid solvent and a zinc halide followed by heating this assembly to a reaction temperature at which the aluminum displaces nascent zinc from the zinc halide to form an iron-zinc alloy at the bond which unites the parts together.

This invention is particularly useful in making heat exchangers of steel and stainless steel because such heat exchangers have been found to be very strong and to have excellent heat transfer characteristics.

Previous methods of bonding ferrous metal elements together included the use of low temperature solders or high temperature brazing. Neither of these is completely satisfactory as the soldered units lack strength and fatigue resistance while brazing processes are expensive, tend to cause distortion in the completed unit and are sometimes difficult to adapt to fast production procedures. The reaction technique of this invention avoids these defects.

BRIEF DESCRIPTION OF THE DRAWINGS

FIG. 1 is a perspective view of a simple tube and fin heat exchanger section embodying the invention.

FIG. 2 is a semi-schematic side elevational view illustrating the immersing of the assembly of tubes and interconnecting fins in the liquid bonding composition.

FIG. 3 is a semi-schematic view of the complete heat exchanger with the ferrous metal member parts united by the process of this invention.

DESCRIPTION OF THE PREFERRED EMBODIMENT

In the illustrated embodiment there is shown only a pair of tubes 10 of flat oval cross section assembled in FIG. 1 with a serpentine fin 11 having apexes 12 adjacent to each other.

In the assembly as shown in FIG. 1 which shows the parts without a supporting frame means for simplicity of illustration, there are provided a plurality of superimposed sheets of aluminum foil 13, aluminized steel sheets can also be used, between and in contact with the ferrous metal tubes 10 and the apexes 12 of the serpentine fin 11. Both the tubes 10 and the fin 11 are of ferrous metal such as stainless steel.

While these parts are in assembly they are coated at the areas of the apexes 12, the tubes 10 and the aluminum foil 13 with a liquid bonding composition 14 as disclosed in the above Simpelaar patent. In the embodiment as illustrated in FIG. 2 this liquid 14 is held in a container 15 while the assembly 16 is immersed in the liquid as indicated by the arrow 18. This immersing of the assembly and removal from the liquid provides a bonding composition at the areas of the intended joints where the apexes 12 of the fin 11 are adjacent to the tubes 10 and in contact with the aluminum 13.

After being removed from the liquid 14 and drained as by suspending the assembly 16 for gravity flow of excess liquid 14 the thusly coated assembly is heated in an oven which may be either a hot air, electric, gas flame, radiant, or any other type of industrial heating oven.

This heating causes the aluminum metal to displace zinc from the zinc halide of the solution 14 in the form of nascent zinc which immediately alloys with the iron of the ferrous metal as disclosed in the above Simpelaar patent to form the bond according to the following reaction:

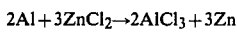

$$2Al + 3ZnCl_2 \rightarrow 2AlCl_3 + 3Zn$$

The principal bonding compound or salt is zinc halide as the aluminum replaces zinc which is then available for alloying with the ferrous metal to form the bond. A readily available and efficient zinc halide is zinc chloride.

The bonding compositions of this invention as disclosed in the above Simpelaar patent in addition to the zinc halide as above disclosed also include a reactant solvent. These solvents are those that have Lewis base characteristics and that react with the zinc halide to form complexes which in proper amounts do not materially settle out of the liquid over considerable periods of time. The amount of zinc halide in the composition is at least about 10% by weight of the liquid composition (and preferably at least about 40% by weight of the composition) with the maximum amount being limited only by the reactivity of zinc halide with the solvent. Thus, the ultimate amount of zinc halide is that required to form a saturated solution.

The organic solvents having the characteristics of a Lewis base that are useful with the bonding compounds and particularly the zinc halides of this invention are compounds that function as electron donors to form coordinate complexes with the zinc halide. The following are useful solvents for making the liquid bonding compositions of this invention.

Ketones—The most important ketones are the saturated aliphatic of the formula $C_nH_{2n}O$ where n equals 3 to 12. Typical ketones are acetone, methyl ethyl ketone, methyl isopropyl ketone, di-isopropyl ketone, methyl isoamyl ketone, diethyl ketone, 2-heptaneone, methyl isobutyl ketone, 3-heptanone, 3-undecanone and isobutyl heptyl ketone, of which the first four are preferred.

Liquid 1-4 diketones are also useful solvents. An example of these is 2-5 hexanedione.

Another group of ketones is the liquid unsaturated aliphatic compounds having only one unsaturated bond in the molecule of which mesityl oxide is an example.

Liquid cyclic aliphatic ketones may also be used of which cyclohexanone is an example.

Alcohols—The alcohols include saturated aliphatic alcohols of the formula $C_nH_{2n+1}OH$ where n is 1 to 6.

Examples of such alcohols are methyl alcohol, ethyl alcohol, isopropyl alcohol, tert-butyl alcohol, n-amyl alcohol, sec-butyl alcohol and 1-hexanol of which the first three are preferred.

Olefinic alcohols of the formula $C_nH_{2n-1}OH$ may also be used with n being 3 to 6. A good example of such alcohols is allyl alcohol.

Another group of alcohols are the heteroalkyl alcohols of which tetrahydrofurfuryl alcohol is an example.

Halogen substituted aliphatic alcohols such as chloro-substituted alcohols may be employed. Examples of these are 2-chloroethanol, 1-chloro-2-propanol, 2-chloro-1-propanol and 3-chloro-2-butanol.

Aldehydes—An excellent aliphatic aldehyde composition for use as a solvent is an aqueous solution of formaldehyde or formalin. Customarily, formalin contains about 37% of formaldehyde in water solution.

Water—Water is an excellent solvent for use in the bonding compositions of this invention. This is particularly true if the water solutions are freshly prepared and not carried over to the next day. This is preferred because the zinc halide tends to hydrolyze on standing for a considerable period of time resulting in loss of zinc from the solution by precipitating in the form of the zinc oxide or hydroxide.

Nitriles—Aliphatic nitriles of the formula $C_nH_{2n+1}CN$ where n equals 1 to 6 are excellent solvents for the compositions of this invention. Examples of such nitriles are butyronitrile and acetonitrile. Unsaturated nitriles of the formula $C_nH_{2n-1}CN$ where n is 2 to 6 may also be used. Such nitriles include acrylonitrile, crotononitrile and allyl cyamide.

Esters—Certain liquid esters of saturated acids are also excellent solvents. These esters include the methyl and ethyl esters of aliphatic acids of 1 to 8 carbon atoms and formates and acetates of aliphatic alcohols of 1 to 5 carbon atoms. Thus, the methyl and ethyl esters are those of acids from formic through caprylic, while the formates and acetates are those from methyl alcohol through amyl. Examples of useful esters include ethyl butyrate, ethyl formate, methyl caprylate and the formates and acetates of methyl alcohol, ethyl alcohol, n-propyl and i-propyl alcohol, n-butyl and i-butyl alcohol and n-amyl and i-amyl alcohol. Other usable esters include esters of chloroacetic acid and unsaturated acids such as methyl acrylate and methyl methacrylate. Orthoesters, such as the methyl and ethyl esters of orthoformic, orthoacetic, and orthopropionic acids are also excellent solvents.

Lactones—Lactones having 3 to 4 methylene groups in the ring are excellent solvents in the compositions of this invention. Examples are gamma-butyrolactone and gamma- and deltavalerolactone.

Ethers—Certain ethers may also be used as solvents in this invention. These include cyclic ethers such as tetrahydrofuran. Alcohol ethers such as aliphatic alcohol ethers of 1 to 4 carbon atoms in the alkoxyl and alcohol groups are also useful solvents. Examples include 2-butoxyethanol and methoxy isopropanol.

These solvents may be used alone or in mixtures. Furthermore, they may be unsubstituted or substituted, particularly with halogen groups, so long as the functional group is not inhibited by the substituent, in other words, so long as the ketone continues to function as a ketone, the alcohol as an alcohol, nitrile as a nitrile and the like.

An excellent example of a mixture of compounds used as a solvent is a product known as methyl acetone. This is a mixture of acetone, methyl acetate and methyl alcohol. Another such mixture is one comprising 20% methyl isobutyl ketone and 80% acetone. Another such mixture is known as Synasol solvent which is a mixture of low boiling point alcohols.

Normally and preferably, at least one fluxing salt of types that are well known in the art is also used, but in a considerably smaller amount than heretofore used.

The composition contains at least about 10% and preferably at least 40% by weight of the composition of the zinc halide, and about 0.3–0.6 part of an alkali metal halide flux such as lithium fluoride or sodium fluoride. The zinc halide salt may be zinc chloride, although the bromide and iodide salts may also be used.

The preferred ammonium halide fluxing agent comprises ammonium chloride. Ammonium bromide and ammonium iodide may also be used in lieu of the ammonium chloride but appear to offer no particular advantages thereover and are more expensive.

Sodium fluoride comprises a preferred additional fluxing agent utilized in conjunction with the ammonium halide salt. Other fluxing agents, where used, include sodium iodide, sodium bromide, potassium acid fluoride, sodium acid fluoride, potassium fluoride and lithium fluoride.

EXAMPLE 1

A liquid composition was produced by first adding 37.5 pounds of zinc chloride to 22.5 pounds of methyl ethyl ketone. After stirring for about an hour to complete the reaction, a mixture of 0.75 pound crystalline copper fluoride, 1.2 pounds ammonium fluoride and 0.45 pound sodium fluoride were added and stirring was continued until substantially homogeneous.

EXAMPLE 2

In this example the liquid composition was produced by adding each of the salts of Example 1 concurrently to the ketone solvent.

EXAMPLE 3

The same procedure was followed as in Example 1 but acetone was substituted for the methyl ethyl ketone.

EXAMPLE 4

In this example a liquid composition was produced by first adding 37.5 pounds of zinc chloride to 22.5 pounds of methyl ethyl ketone. After stirring for about one hour to complete the reaction a mixture of 1.2 pounds of ammonium fluoride and 0.45 pound of sodium fluoride was added and stirring was continued until substantially homogeneous.

EXAMPLE 5

An assembly of contacting stainless steel tubes and serpentine fin similar to the tubes 10 and fin 11 of the illustrated embodiment was made. The tubes and fins had three sheets of aluminum foil between them and the assembly was dipped into the bonding liquid of Example 4, the excess liquid drained off and the assembly with retained liquid was heated in a 500°–1500° F. oven thereby causing the aluminum to displace the zinc from the zinc chloride in forming a bond illustrated at 19 in FIG. 3 between the stainless steel tubes and fin 11.

EXAMPLE 6

Example 5 was repeated except for using aluminized steel sheets instead of the aluminum foil.

The bonding composition of this invention may be applied by any suitable means such as by dipping, brushing, spraying or the like. Subsequent to the application of the bonding composition to the material, the material is heated as by placement in a suitable oven heated to produce a bonding temperature which is preferably approximately in the range of 500°–1500° F. oven temperature. The heat is applied heat plus the exothermic heat of reaction.

Having described our invention as related to the embodiment shown in the accompanying drawings, it is our intention that the invention be not limited by any of the details of description, unless otherwise specified, but rather be construed broadly within its spirit and scope as set out in the appended claims.

We claim:

1. The method of bonding together a plurality of ferrous metal members, comprising: assembling said members with aluminum metal comprising a plurality of superimposed aluminum foil strips between and in contact with the assembled members; coating the resulting assembly with a liquid bonding composition comprising a fluxing agent, a liquid solvent having the characteristics of a Lewis base toward zinc halide as a Lewis acid by forming with said zinc halide a coordinate complex decomposing on heating while in contact with said aluminum and said ferrous metal members to yield nascent zinc, and an amount of zinc halide between about 10 weight percent of said bonding composition and substantially complete saturation of said solvent; draining said liquid bonding composition from said assembly; and heating said assembly at a temperature between about 500°–1500° F. whereby said aluminum displaces nascent zinc from said zinc halide, the nascent zinc thereby uniting with the ferrous metal to form a secure joint comprising iron-zinc alloy, said zinc halide being either zinc chloride, zinc bromide, zinc iodide or mixtures thereof.

2. An assembly of a plurality of ferrous metal members bonded together by the method comprising: assembling said members with aluminum metal comprising a plurality of superimposed aluminum foil strips between and in contact with the assembled members; coating the resulting assembly with a liquid bonding composition comprising a fluxing agent, a liquid solvent having the characteristics of a Lewis base toward zinc halide as a Lewis acid by forming with said zinc halide a coordinate complex decomposing on heating while in contact with said aluminum and said ferrous metal members to yield nascent zinc, and an amount of zinc halide between about 10 weight percent of said bonding composition and substantially complete saturation of said solvent; draining said liquid bonding composition from said assembly; and heating said assembly at a temperature between about 500°–1500° F. whereby said aluminum displaces nascent zinc from said zinc halide, the nascent zinc thereby uniting with the ferrous metal to form a secure joint comprising iron-zinc alloy, said zinc halide being either zinc chloride, zinc bromide, zinc iodide or mixtures thereof.

3. A heat exchanger, comprising: an assembly of a plurality of ferrous metal members bonded together by the method comprising assembling said members with aluminum metal comprising a plurality of superimposed aluminum foil strips between and in contact with the assembled members; coating the resulting assembly with a liquid bonding composition comprising a fluxing agent, a liquid solvent having the characteristics of a Lewis base toward zinc halide as a Lewis acid by forming with said zinc halide a coordinate complex decomposing on heating while in contact with said aluminum and said ferrous metal members to yield nascent zinc, and an amount of zinc halide between about 10 weight percent of said bonding composition and substantially complete saturation of said solvent; draining said liquid bonding composition from said assembly; and heating said assembly at a temperature between about 500°–1500° F. whereby said aluminum displaces nascent zinc from said zinc halide, the nascent zinc thereby uniting with the ferrous metal to form a secure joint comprising iron-zinc alloy, said zinc halide being either zinc chloride, zinc bromide, zinc iodide or mixtures thereof.

* * * * *